United States Patent
Kim

(10) Patent No.: US 8,376,859 B2
(45) Date of Patent: Feb. 19, 2013

(54) ONLINE GAME PROVISION SYSTEM USING STORAGE MEDIUM AND METHOD THEREOF

(75) Inventor: Dong-Gun Kim, Ansan-si (KR)

(73) Assignee: Nexon Corporation, Seoul (KR)

( * ) Notice: Subject to any disclaimer, the term of this patent is extended or adjusted under 35 U.S.C. 154(b) by 268 days.

(21) Appl. No.: 12/920,379

(22) PCT Filed: Aug. 13, 2009

(86) PCT No.: PCT/KR2009/004533
§ 371 (c)(1), (2), (4) Date: Aug. 31, 2010

(87) PCT Pub. No.: WO2010/150937
PCT Pub. Date: Dec. 29, 2010

(65) Prior Publication Data
US 2011/0177866 A1 Jul. 21, 2011

(30) Foreign Application Priority Data
Jun. 26, 2009 (KR) .................. 10-2009-0057551

(51) Int. Cl.
A63F 9/24 (2006.01)
G06F 17/00 (2006.01)

(52) U.S. Cl. ............. 463/42; 717/173; 717/170; 463/43

(58) Field of Classification Search .................. None
See application file for complete search history.

(56) References Cited

U.S. PATENT DOCUMENTS 6,493,871 B1 * 12/2002 McGuire et al. ............. 717/173
2004/0010685 A1 * 1/2004 Sakaguchi et al. ........... 713/168
2004/0031028 A1 * 2/2004 Hunt et al. ................... 717/170
2004/0107416 A1 * 6/2004 Buban et al. ................. 717/170
2004/0117619 A1 * 6/2004 Singer et al. ................. 713/156
2004/0210720 A1 * 10/2004 Wong et al. .................. 711/132
2005/0026700 A1 * 2/2005 Blanco ........................... 463/43
2006/0035713 A1 * 2/2006 Cockerille et al. ............. 463/42
2006/0048129 A1 * 3/2006 Napier et al. ................. 717/168
2006/0085686 A1 * 4/2006 Cheston et al. ................. 714/38
2006/0206587 A1 * 9/2006 Fabbrocino .................. 709/219
2007/0208829 A1 * 9/2007 Kim et al. .................... 709/219
2007/0247905 A1 * 10/2007 Rudelic .................... 365/185.04
2007/0294756 A1 * 12/2007 Fetik ............................. 726/11
2009/0172659 A1 * 7/2009 Oberg et al. ................. 717/178
2010/0106685 A1 * 4/2010 Ott et al. ..................... 707/611

* cited by examiner

Primary Examiner — Paul A D'Agostino
(74) Attorney, Agent, or Firm — IPLA P.A.; James E. Bame

(57) ABSTRACT

The present invention discloses an online game provision system using a storage medium and a method thereof. The online game provision system includes a database server, a storage medium, and a Personal Computer (PC). The database server stores patch files corresponding to a video and image file, a sound file and a game program executable file which are necessary to play the game, and information about the version of each of the patch files. The storage medium stores the video and image file, the sound file, the game program executable file, the latest patch executable file, and an account authority processing executable file which are necessary to play the game. The PC is connected to the database server, receives the input of the storage medium, and includes an Operating System (OS) for detecting the input of the storage medium and automatically executing the latest patch executable file.

8 Claims, 6 Drawing Sheets

ONLINE GAME PROVISION SYSTEM USING STORAGE MEDIUM AND METHOD THEREOF

TECHNICAL FIELD

The present invention relates, in general, to an online game provision system using a storage medium and a method thereof, and, more particularly, to an online game provision system using a storage medium and a method thereof, which enable a user to play the online game without performing a separate installation process on a Personal Computer (PC) that the user desires to play the game on by using a storage medium storing a video and image file, a sound file, a game program executable file, the latest patch executable file, and an account authority processing executable file which are necessary to play the online game, which apply one or more latest patch files provided from a game provider to the game by directly checking and updating the latest patch files, and which enable the game to be played regardless of account authority even in the case where the user does not have account authority for a PC desired to be used.

BACKGROUND ART

Online games refer to games which can be played by connecting computers to external systems via telephone or cables, and have grown in considerable fields and in various genres, such as Role-Playing Games (RPGs), Massively Multiplayer Online Role-Playing Games (MMORPGs), arcade games and simulation, so that the market size thereof and the number of game users have become huge.

Based on such growth in online games, game providers have distributed online games to users for the most part using two methods.

The first is an offline method in which compressed game data and an installation file that unpacks the compressed game data are packaged with each other, after which they are provided on a specific storage medium (for example, a Compact Disk (CD) or a Digital Versatile Disc (DVD)). When a game is installed using the above-described method, a person who wants to enjoy the game should perform a separate installation process on his/her PC that is going to be used.

In greater detail, the storage medium for recording a game program includes a program for the game, a program which enables playing on a network, the product key or serial number (hereinafter, referred to as the CD Key) of the storage medium, and a CD key determination program which enables authenticity to be determined. Users should execute an installation file stored on the storage medium, write the CD Key, determine whether the value of the CD key is authentic using the CD Key determination program, and then install the corresponding program.

The second is an online method in which a game, packaged in the same manner as in the offline method is requested from a server in not an offline but in an online manner, is downloaded and then installed, or alternatively in which the corresponding file is fetched from the server and installed while an installation file is executed.

Currently, the offline method is typically used.

However, with the generalization of computing environments in which account authority is set, the compensation of data stored on a storage medium is not realized depending on account authority.

In greater detail, it has been very difficult to install data stored on the storage medium on a PC that a user desires to play the game on or to play the game while supporting the data from the latest version because of account authority.

That is, the above-described prior art has the following problems:

There is the problem of complexity because, when users want to play the online game on a PC, the users should perform a separate game installation process before playing the game. Online game providers provide one or more patches in order to improve the instability of the program, which is detected when a game service process is running, and in order to change and add functions. The patches are not provided once but are provided to users whenever one or more program errors are corrected or the functions of the game are changed or added to. Therefore, there is the problem of complexity because the users should frequently collect patches at a time and install the patches over a long period of time, and then play the game.

Further, in the prior art, with the current generalization of computing environments in which account authority is set up, games cannot be run on a PC where the user does not have account authority unless account policies are not modified, so that there is the problem of inevitably bringing about sensitive matters, such as security issues.

SUMMARY OF THE INVENTION

Accordingly, the present invention has been made keeping in mind the above problems occurring in the prior art, and an object of the present invention is to provide an online game provision system using a storage medium and a method thereof, which enable users to play the game without performing a separate online game installation process, and which enable the online game to be run by effectively updating one or more patch files generated after the game was distributed using a specific storage medium.

Another object of the present invention is to provide an online game provision system using a storage medium and a method thereof, which enable the game to be played regardless of account authority (for example, write authority) for a PC in a condition that the use of the PC is limited when there is no account authority for the PC desired to be used because of the generalization of current computing environments that account authority is set for a PC.

In order to accomplish the above objects, the present invention provides an online game provision method using a storage medium, the method including the steps of: (a) detecting that a storage medium storing a video and image file, a sound file, a game program executable file, a latest patch executable file and an account authority processing executable file which are necessary to play a game was input to a Personal Computer (PC); (b) accessing a database server in such a way that the latest patch executable file is automatically executed by an Operating System (OS), and receiving information about the version of each of patch files corresponding to the video and image file, the sound file, and the game program executable file; (c) comparing the information about the version of the patch file with information about the version of each of game files corresponding to the video and image file, the sound file, and the game program executable file which are stored on the storage medium, receiving each of the patch files, the information about the version of which is higher than the information about the version of the game file, and storing the received each of the patch files in a "My document" directory; and (d) making an inquiry to the OS about whether the current user of the PC has execution authority for a hard disk or execution authority for the storage medium, playing the game in such a way that the game program executable file stored on the storage medium is executed, and each of the patch files stored in the "My document" directory is read into memory when the current user does not have the execution authority for the hard disk but has the execution authority for the storage medium, playing the game in such a way that the account authority processing executable file is executed so as to make an inquiry to the user about administration authority account information, administration account authority is approved by the OS using the administration authority account information, an arbitrary directory to which execution authority is given is generated in the "My document" directory, each of the game files stored on the storage medium and each of the patch files stored in the My document directory are copied into the generated directory, and the game program executable file from among the copied game files is executed when the current user does not have the execution authority for the hard disk nor the storage medium, and playing the game in such a way that an arbitrary directory to which execution authority is given is generated in the hard disk, each of the game files stored on the storage medium and each of the patch files stored in the "My document" directory are copied into the generated directory, and the game program executable file from among the copied game files is executed when the current user has the execution authority for the hard disk.

Further, in the present invention, it is preferable that the storage medium be a read-only storage medium which includes Secure Digital (SD) memory or a Digital Versatile Disc (DVD).

In the present invention, the storage medium is a writable storage medium which includes Universal Serial Bus (USB) memory; the step (c) includes: comparing the information about the version of each of the patch files with information about the version of each of the game files corresponding to the video and image file, the sound file, and the game program executable file which are stored on the storage medium, receiving each of the patch files, the information about the version of which is higher than the information about the version of each of the game files, and storing the received each of the patch files in a "My document" directory; and making an inquiry to the user about whether to update one of the game files stored on the storage medium to a latest file, and storing the corresponding patch file stored in the "My document" directory on the storage medium when the user selected to "overwrite now"; and the step (d) includes storing the corresponding patch file stored in the "My document" directory on the storage medium using a separate process at the same time that the game is played when the user selected to "overwrite while playing the game" at the step (c).

Further, in the present invention, the storage medium is a writable storage medium which includes USB memory; and the online game provision method further includes (e) making an inquiry to the user about whether to store user option information which includes information about game settings and individual play in the game, and storing the user option information on the storage medium when the user selected to store the user option information.

Further, the present invention provides an online game provision system using a storage medium, the online game provision system including: a database server configured to store patch files corresponding to a video and image file, a sound file and a game program executable file which are necessary to play a game, and information about the version of each of the patch files; a storage medium configured to store the video and image file, the sound file, the game program executable file, a latest patch executable file, and an account authority processing executable file which are necessary to play the game; and a PC connected to the database server in a wired/wireless manner, configured so that the storage medium is input, and configured to include an OS for detecting the input of the storage medium and automatically executing the latest patch executable file stored on the storage medium; and wherein the latest patch executable file accesses the database server and receives information about the version of each of the patch files corresponding to the video and image file, the sound file and the game program executable file, compares the information about the version of each of the patch files with information about the version of each of game files corresponding to the video and image file, the sound file, and the game program executable file which are stored on the storage medium, receives each of the patch files, the information about the version of which is higher than the information about the version of the game file, from the database server and stores the received patch file in a "My document" directory, makes an inquiry to the OS about whether the current user of the PC has execution authority for a hard disk or execution authority for the storage medium, executes the game program executable file stored on the storage medium when the current user does not have execution authority for the hard disk but has the execution authority for the storage medium, executes the account authority processing executable file so as to make an inquiry to the user about administration authority account information, receives administration authority, generates an arbitrary directory, to which execution authority is given, in the "My document" directory, copies each of the game files stored on the storage medium and each of the patch files stored in the "My document" directory into the generated directory, and executes the game program executable file from among the copied game files when the current user does not have the execution authority for the hard disk nor the storage medium, and generates an arbitrary directory, to which execution authority is given, in the hard disk, copies each of the game files stored on the storage medium and each of the patch files stored in the "My document" directory into the generated directory, and executes the game program executable file from among the copied game files when the current user has the execution authority for the hard disk; wherein the game program executable file plays the game in such a way that the corresponding game file and the corresponding patch file are copied and combined in memory when the game program executable file is executed on the storage medium, and plays the game using the game file stored in a same directory when the game program executable file is executed in the arbitrary directory generated in the "My document" directory and when the game program executable file is executed in the arbitrary directory, to which execution authority is given, generated in the hard disk; and wherein the account authority processing executable file makes an inquiry to the user about the administration authority account information, and then receives administration account authority from the OS using the administration authority account information.

Further, in the present invention, the storage medium may be a read-only storage medium which includes SD memory or a DVD.

Further, in the present invention, the storage medium is a writable storage medium which includes USB memory; and the latest patch executable file receives each of the patch files, the information about the version of which is higher than the information about the version of each of the game files, from the database server and stores each of the patch files in the "My document" directory, makes an inquiry to the user about whether to update the game file stored on the storage medium to a latest file, stores the corresponding patch file stored in the "My document" directory on the storage medium when the user selected to "Overwrite Now", and stores the corresponding patch file stored in the "My document" directory on the storage medium while the game program executable file is playing the game when the user selected to "Overwrite while playing the game".

Further, in the present invention, the storage medium is a writable storage medium which includes USB memory; and the game program executable file makes an inquiry to the user about whether to store user option information which includes information about game settings and individual play in the game, and stores the user option information on the storage medium when the user selected to store the user option information.

The online game provision system using a storage medium and a method thereof according to the present invention described above may have the following advantages:

That is, the present invention has an advantage of providing convenience to users since the online game can be played without performing a separate installation process and patch files provided from a game provider are applied to the online game by directly checking and updating the latest patch files.

Further, the present invention has an advantage of providing convenience to users since the game can be played regardless of account authority for a PC even in the case where a user does not have account authority for the PC desired to be used in computing environments in which account policies have become generalized.

Further, the present invention has an advantage of providing convenience to users since the online game can be played without performing a separate installation process if a user connects a portable storage medium (for example, Secure Digital (SD) memory, a DVD, or Universal Serial Bus (USB) memory) to another PC, and one or more latest patch files provided from a game provider are applied to the online game by directly checking and updating the latest patch files.

Figure 1:
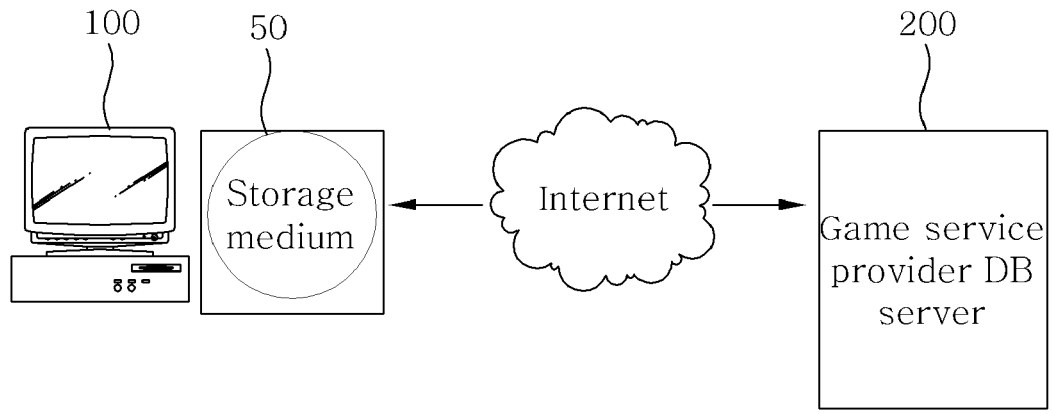
FIG. 1 is an entire system diagram showing the overall configuration of a game provision system using a storage medium according to a preferred embodiment of the present invention.

* DESCRIPTION OF REFERENCE NUMERALS
OF PRINCIPAL ELEMENTS IN THE DRAWINGS
*

| | |
|---|---|
| 50: | storage medium |
| 100: | client PC |
| 110: | storage medium interface unit |
| 120: | communication unit |
| 130: | control unit |
| 140: | input unit |
| 150: | output unit |
| 160: | storage unit |
| 200: | game provider-database server |

DETAILED DESCRIPTION OF THE INVENTION

Embodiments of an online game provision system using a storage medium and a method thereof according to the above-described present invention will be described in detail with reference to the accompanying drawings below.

FIG. 1 is an entire system diagram showing the overall configuration of an online game provision system using a storage medium according to a preferred embodiment of the present invention.

As shown in FIG. 1, the present invention includes a storage medium 50, a PC 100, and a game service provider database server 200.

The storage medium 50 stores a video and image file, a sound file, a game program executable file, the latest patch executable file, and an account authority processing executable file in order to execute a specific online game.

The latest patch executable file is programmed to download the latest patch file from the game service provider database server 200 and to be driven with the game program executable file.

The game program executable file is a file in which a series of procedures and operations are programmed in order to play and move a game forward, and is configured to express and move the game forward by loading the video and image file and the sound file.

The account authority processing executable file performs the function of making an inquiry to a user about administration account information when the user does not have execution authority for the hard disk, and performs the function of requesting from an Operation System (OS) execution authority for the hard disk using the administration account information.

Meanwhile, the storage medium 50 may be a storage medium which is read only memory, such as SD memory or a DVD, or may be a storage medium which is writable memory, such as USB memory.

The PC 100 is a user terminal used to play the online games by accessing the video and image file, the sound file, the game program executable file, the latest patch executable file, and the account authority processing executable file which are stored on the storage medium 50. Further, the PC 100 is connected via a wired/wireless internet network to the game service provider database server 200 which will be described later.

The game service provider database server 200 provides one or more patch files in order to improve a program or to change and add one or more functions to the game after the online game stored on the storage medium 50 is released. The database server 200 receives a connection through the communication via the Internet from the latest patch executable file, and gives support for the user to effectively receive patch information and run the game by transmitting the patch information and the patch files.

Figure 2:
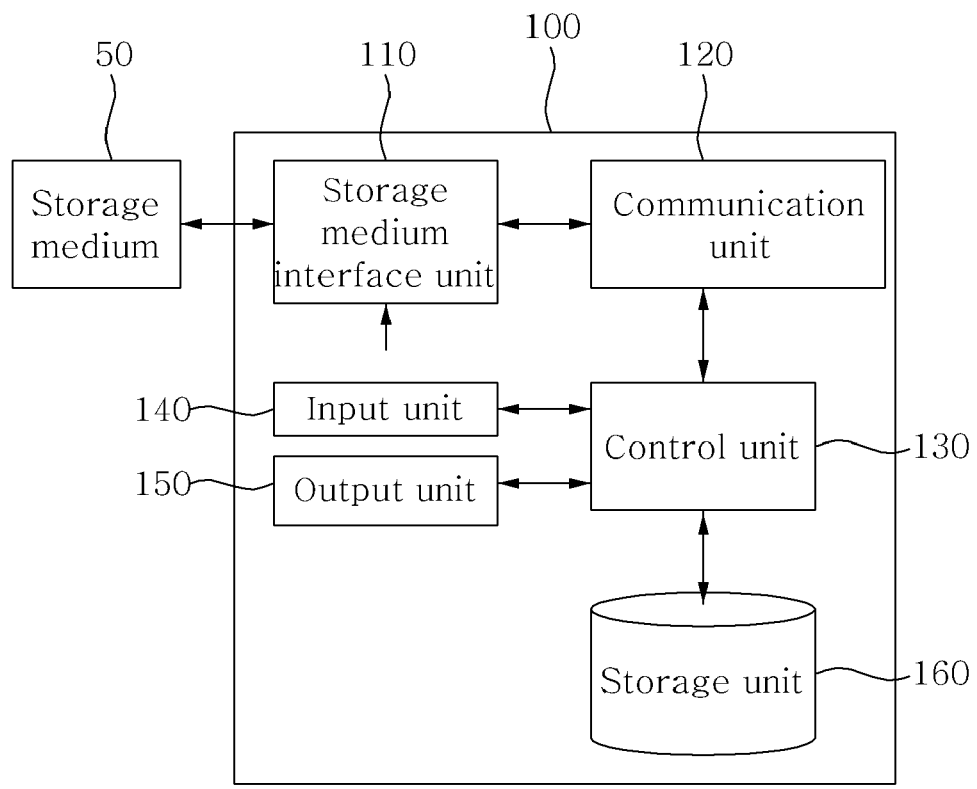
FIG. 2 is a block diagram showing the inner configuration of a PC according to the preferred embodiment of the present invention.

FIG. 2 is an inner block diagram showing the inner configuration of the PC according to the preferred embodiment of the present invention.

Referring to FIG. 2, the PC 100 of the present invention includes a storage medium interface unit 110, a communication unit 120, a control unit 130, an input unit 140, an output unit 150, and a storage unit 160.

When the storage medium 50 is input from the outside, the storage medium interface unit 110 detects the input. That is, the OS can detect the input of a new device as an event, and automatically execute the executable file included on the storage medium. At this time, an automatic executable file (auto run) item may be used. If an autorun.inf file is stored in the root directory of the storage medium and information about the latest patch executable file to be executed is written in the autorun.inf file, the latest patch executable file is executed at the same time that the storage medium is input, information about the version of a patch file which has been updated recently is received from the game provider database server 200, and information about the version of the game file of the game that is stored on the storage medium 50 is compared with the information about the version of the received patch file. When the information about the version of the game file is lower than the information about the version of the patch file and an update is required, the corresponding patch file is received from the database server 200 and stored in a "My document" directory in which one or more files can be stored regardless of the account authority of a current user.

The following procedure proceeds depending on the account authority of the current user. The OS, which manages user accounts, can be inquired about the account authority of the current user. First, it is determined whether the current user has execution authority for the hard disk and execution authority for the storage medium.

When the current user has execution authority for the hard disk, the game is played in such a way that the user is allowed to select whether to copy the game file onto the hard disk, when the user wants to do the copying, an arbitrary directory to which execution authority is given is generated in the hard disk, the game file stored on the storage medium and each patch file stored in the "My document" directory are copied into the generated directory, and the game program executable file from among the copied game files is executed.

Meanwhile, when a response providing notification that the user does not want the game file to be copied onto the hard disk is received from the user, the game may be played by combining the game file with the patch files in memory. That is, the game is played in such a way that the game program executable file is executed so that one or more executable file images are moved from the storage medium 50 to a main memory area, the "My document" directory in which one or more patch files are stored is searched, and, if a new version of the game program executable file exists therein, the new version of the game program executable file is read into memory and the executable file images thereof replaces the executable file images which had previously been moved into the main memory area (hereinafter, referred to as self modification). Further, the video and image file and the sound file which are necessary to move the game forward are executed in the same manner as described above. The game is played in such a way that, when there is a need for the corresponding file, the corresponding file is loaded from the storage medium into memory; and, when a newer version of the file exists in the "My document" directory, the newer version of the file is read into memory and replaces the corresponding file; and, when there is a need for the corresponding file, a newer version of the file is read into memory by simultaneously searching the storage medium and the "My document" directory.

Here, execution authority means the operational authority capable of performing read, write, and execute operations.

When a specific game is played on the PC 100, the PC 100 requires one of the above-described execution authorities. The reason for this is that, when the game is played, the characters and environment of the game change continuously, and this changed data should be written to a specific space in order to move the game forward while applying the changed contents.

Meanwhile, if it is determined that the current user does not have execution authority for the hard disk, it is determined whether the current user has execution authority for the storage medium 50. If it is determined that the current user has execution authority for the storage medium 50, the game program executable file stored on the storage medium 50 is executed, and, if a patch file exists for each game file, the game is played using the above-described self modification method.

Meanwhile, if the current user does not have execution authority for the storage medium 50, a process is performed so that the game is played in such a way that the account authority processing executable file is executed to receive administration account information used to obtain administration authority for the PC from the user, administration account authority is approved by the OS using the administration account information, a specific directory to which execution authority is given is generated in the "My document" directory, and a game file is copied into the generated directory. Here, the game may be played in such a way that a newer version of the patch file replaces the existing game file in memory using the above-described self modification process, or each of the game files stored on the storage medium and each of the more patch files stored in the "My document" directory are copied into the generated directory so that all the game files are configured with the latest version of the game files.

According to the above-description, when a user plays the online game using the storage medium 50 according to the present invention, the game can be played regardless of the account policies of the PC 100 or central data maintenance environments such as Network Attached Storage (NAS).

Further, according to the above-described present invention, the present invention enables a game user to play the game in such a way that the game is not installed using an installer but game information which is necessary to play the game is written on a portable disk, such as SD memory, and the game information written on the portable disk is used. Therefore, there are advantages in that the user can easily play the game on another PC (the user can easily play the game on anther PC using the game information written on the portable disk without installing the game on that PC), and in that the present invention can be easily used when the game is introduced to another user, when a beginner at the game plays the game, and when the user does not want to save the game on his/her PC.

The control unit 130 controls the entire operations so that the PC 100 executes a game by loading the video and image file, the sound file, the game program executable file, the latest patch executable file, and the account authority processing executable file stored on the storage medium 50.

Further, the control unit 130 may be programmed to perform various kinds of signal processing functions (for example, character generation, audio file decoding, volume adjustment, and sample conversion) while a selected game file is executed. The control unit 130 may be implemented in the form of a microprocessor or a Digital Signal Processor (DSP).

The input unit 140 receives a user request from the user. The input unit 140 includes one or more icons or buttons so that various kinds of operations and menu settings can be received in order to perform the functions. The input unit 140 may be configured in the form of an input device having a keypad or a general display device such as a Liquid Crystal Display (LCD).

The output unit 150 outputs results processed by the control unit 130 and results of the game execution. Generally, an LCD is used as the output unit 150.

Games and user option information (for example, information about game settings and individual play) may be selectively stored in the storage unit 160 at the request of the user.

The operational process of the online game provision system using a storage medium according to the present invention will be described in detail with reference to the accompanying drawings below.

Figure 3:
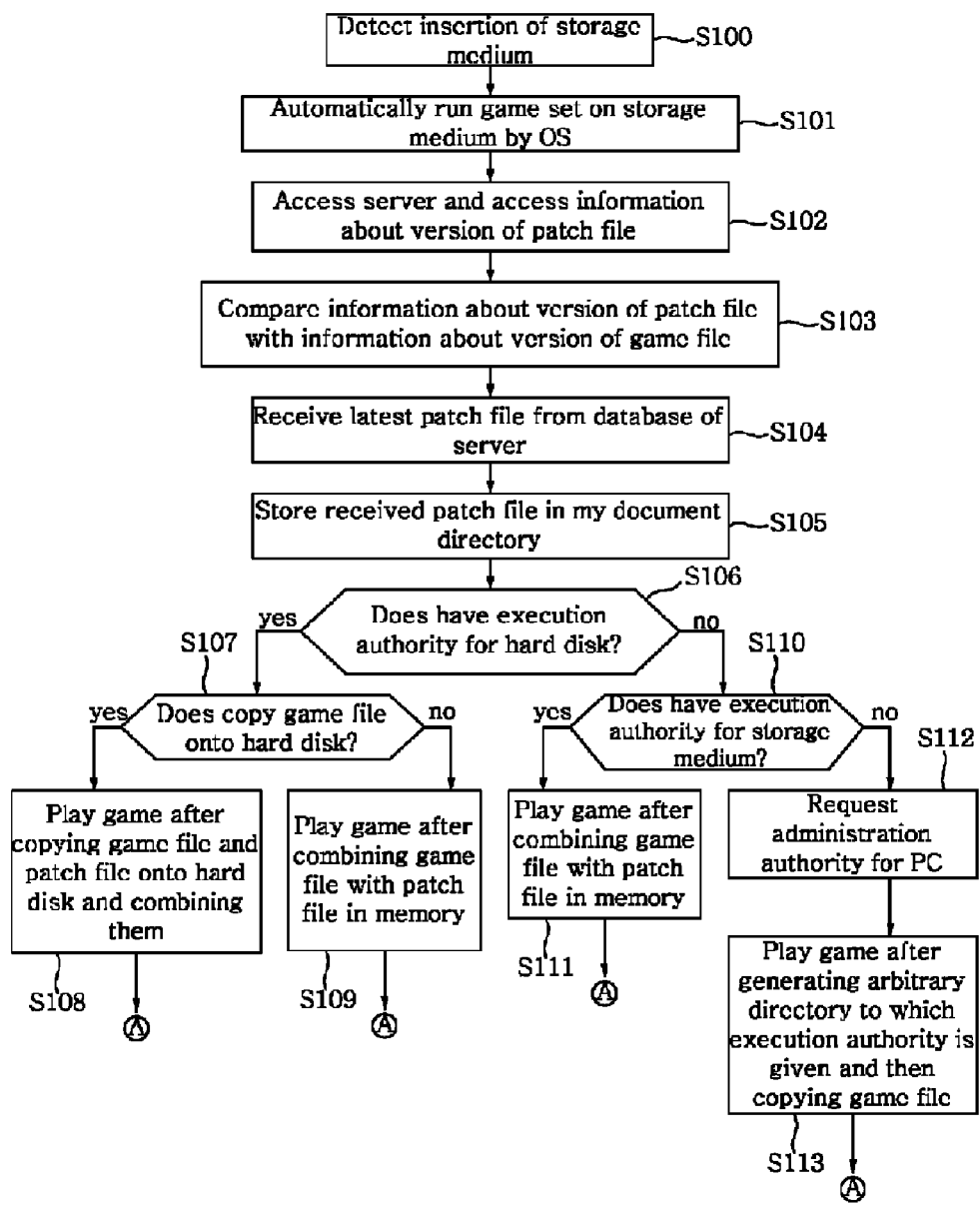
FIG. 3 is a flowchart showing a game provision method performed by the game provision system using a storage medium according to a first embodiment of the present invention.
Figure 4:
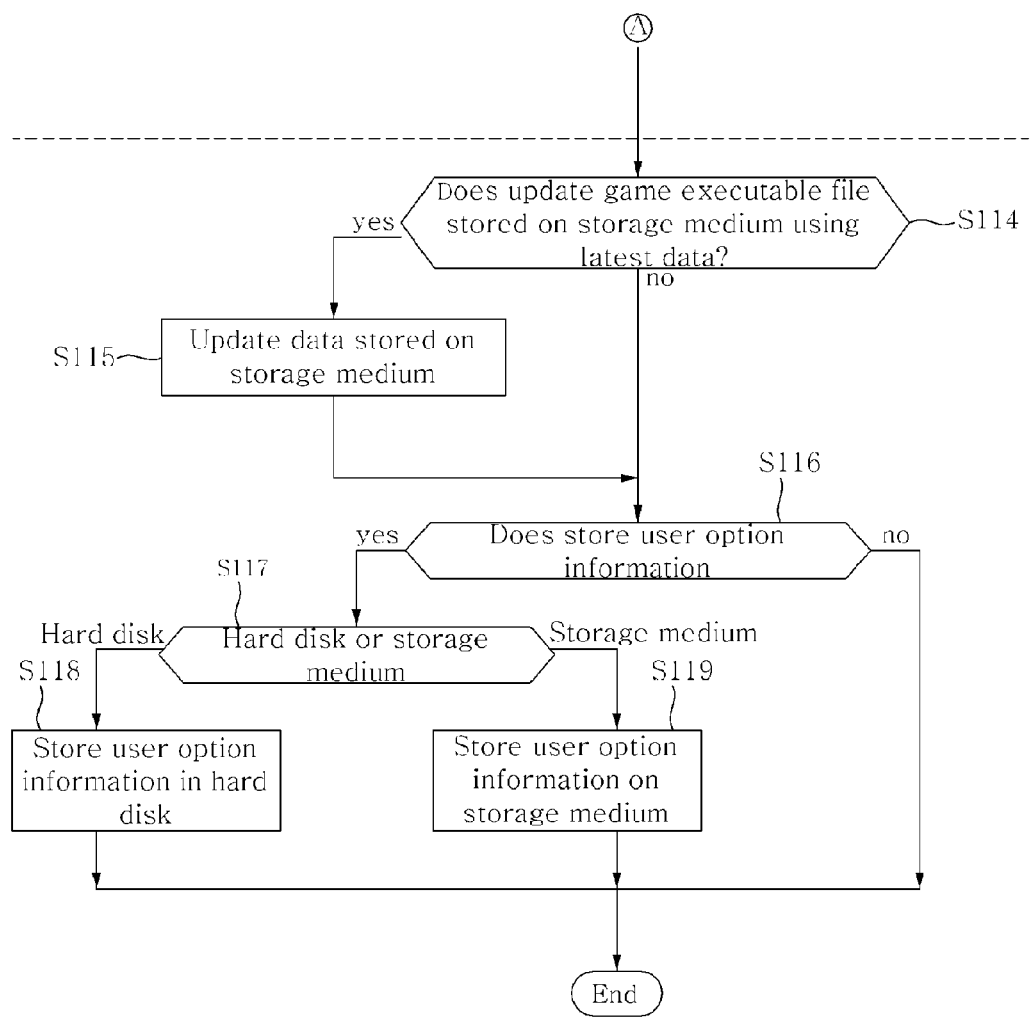
FIG. 4 is a flowchart showing a game provision method performed by the game provision system using a storage medium according to a second embodiment of the present invention.

FIG. 3 is a flowchart showing a game provision method performed by the game provision system using a storage medium according to a first embodiment of the present invention and FIG. 4 is a flowchart showing a game provision method performed by the game provision system using a storage medium according to a second embodiment of the present invention.

Hereinafter, the case in which the storage medium 50 is read only memory, such as SD memory and a DVD, will be described as an example with reference to FIG. 3.

First, the storage medium interface unit 110 detects that a specific storage medium 50 was input at step S100. Here, the latest patch executable file from among the executable files stored on the storage medium 50 is automatically executed by the OS using the above-described autorun process at step S101.

Thereafter, the control unit 130 to which the latest patch executable file is loaded receives information about the version of a patch file from the game provider DB server 200 by controlling the communication unit 120 at step S102.

Thereafter, the control unit 130 to which the latest patch executable file is loaded compares the information about the version of the patch file provided from the game service provider with information about the version of a game file stored in the storage medium 50 at step S103.

The information about the version of a patch file is information given in order to distinguish a patch from previous versions of the patch files whenever a revised patch is released in order to correct one or more game errors, and to change and add to functions thereof. For example, "patch 1.1, patch 1.2, and patch 1.3" may be recorded as the information about the versions of the patch files stored for the user.

If, as a result of the determination at step S103, the information about the version of the game file is lower than the information about the version of the patch file, the control unit 130 requests the patch file from the service provider DB server 200 and receives the patch file at step S104. Here, the received patch file is stored in the "My document" directory at step S105. Thereafter, the control unit 130 to which the latest patch executable file is loaded makes an inquiry to the OS which manages information about user accounts, and determines whether the current user has execution authority for the hard disk of the PC 100 at step S106.

If, as a result of the determination at step S106, the current user has execution authority for the hard disk of the PC 100, the user is inquired about whether to copy the game file stored on the storage medium 50 onto the hard disk at step S107.

If, as a result of the inquiry at step S107, a response providing notification that the game should be played after copying the game file onto the hard disk is received from the user, the game file and the patch file are copied onto the hard disk and then the game program executable file is executed at step S108.

According to the above description, although the startup of the game is slow and a large capacity of the hard disk is required, there is an advantage in that the running speed of the game is fast.

Meanwhile, if, as the result of the inquiry at step S107, a response providing notification that the game file won't be copied onto the hard disk is received, the game is played in such a way that the game file is combined with the patch file in the memory of the PC 100 using the above-described self modification method at step S109. Here, since the process of copying the game file is not performed, there is an advantage in that the startup of the game may be fast.

Meanwhile, if, as the result of the determination at step S106, the current user does not have execution authority for the hard disk of the PC 100, it is determined whether the user has execution authority for the storage medium 50 at step S110. If, as a result of the determination at step S110, the user has execution authority for the storage medium 50, the game is played in such a way that the game file is combined with the patch file in the memory of the PC 100 using the above-described self modification method at step S111.

Figure 5:
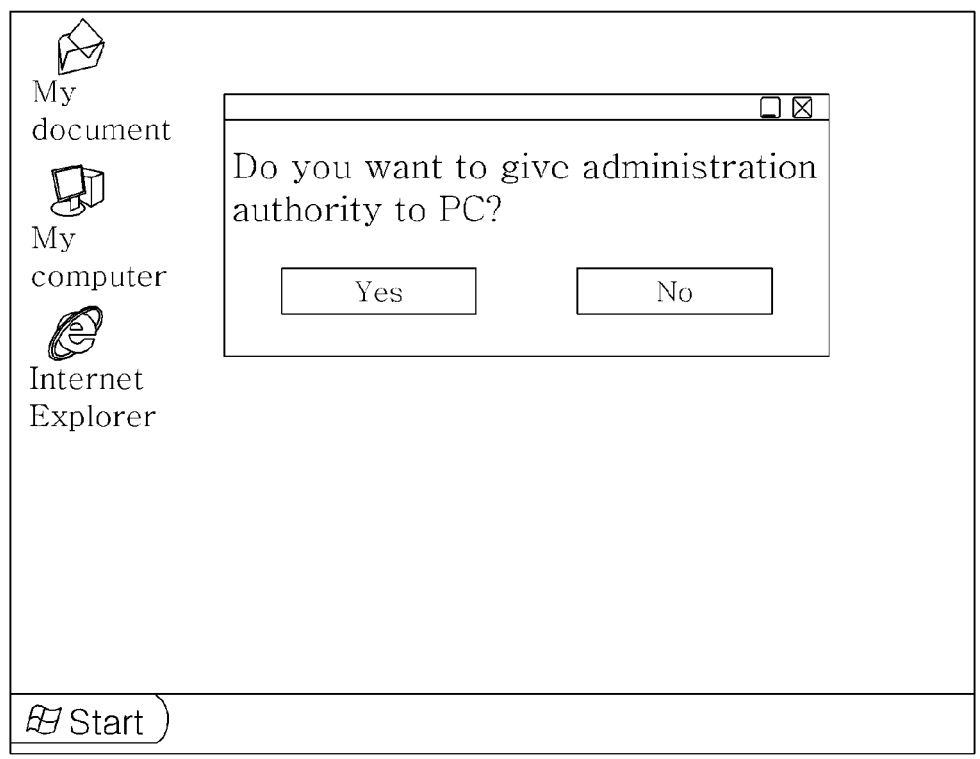
FIG. 5 is a view showing an example in which the first embodiment of the present invention operates.

Meanwhile, if, as the result of the determination at step S110, the current user does not have execution authority for the storage medium 50, the account authority processing executable file is executed, and a pop-up window requesting administration account information from the user is output on the output unit 150 at step S112, as shown in FIG. 5.

In the state in which the pop-up window has been output, the administration account information is received from the user, the received administration account information is transmitted to the OS, and then an administration account authority is set up.

Thereafter, the latest patch executable file generates an arbitrary folder (hereinafter, referred to as the "My document" directory) to which write authority is given, and gives execution authority on the folder at step S110. Thereafter, the latest patch executable file copies the game file into the folder, and then plays the game. Thereafter, the control unit 130 plays the game by overwriting the downloaded patch file on the game file which is being executed or replacing the game file with a newer version of the patch file in memory using the above-described self modification at step S113.

Hereinafter, the case in which the storage medium 50 is writable memory, such as USB memory, will be described as an example with reference to FIG. 4.

Since the operations at steps S100 to S113 are the same as described above, the description thereof will be omitted. The difference between the first and second embodiments is that the storage medium is read only memory in the first embodiment but the storage medium is writable memory in the second embodiment.

Figure 6:
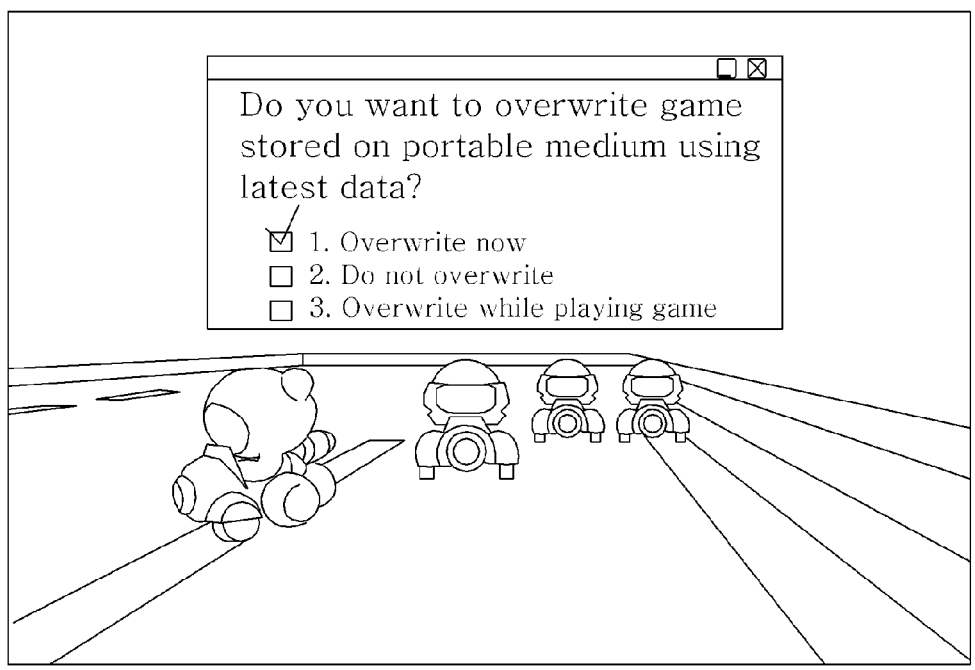
FIGS. 6 and 7 are views showing examples in which the second embodiment of the present invention operates.

The latest patch executable file makes an inquiry about whether to update a game file stored on the storage medium 50 to the latest file at step S114. Here, the control unit 130 controls the output unit 150 so that a pop-up window is output as shown in FIG. 6, and receives a response to the inquiry.

If, as a result of the inquiry at step S116, the response '1. Overwrite now' was received from the user, the patch file stored in "My document" is overwritten on the previous version of the file stored on the storage medium 50 at step S115. This is possible since the storage medium 50 is writable memory such as USB memory.

Meanwhile, if, as the result of the inquiry at step S114, the response '2. Do not overwrite' was received from the user, the game is played instantly. Of course, here, the game should be run by loading the patch file stored in the "My document" directory to memory in order to play the game using the new version of the game file (patch file) from among the game files.

Further, if, as the result of the inquiry at step S114, the response '3. Overwrite while playing the game' was received from the user, the game is started by executing the game program executable file using a separate process, and the latest patch executable file causes the patch file stored in the "My document" directory to overwrite the game file stored on the storage medium 50.

Figure 7:
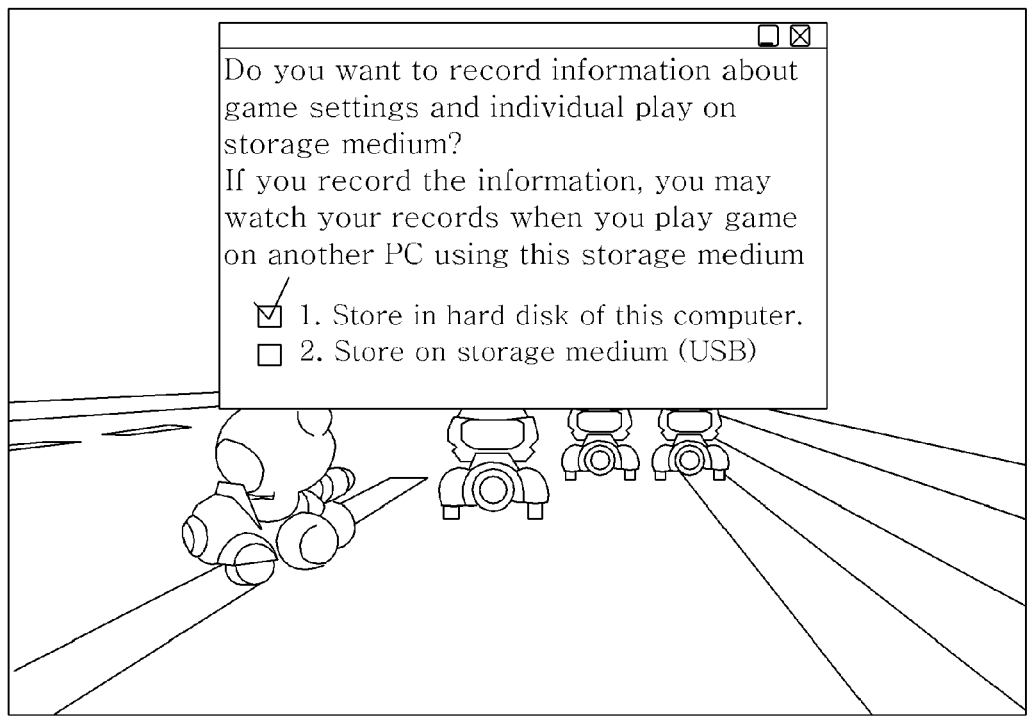

Thereafter, the game program executable file outputs a pop-up window on the output unit 150 as shown in FIG. 7. That is, the game program executable file makes an inquiry about whether to store user option information (for example, information about game settings and individual play) on the storage medium 50 or to store the user option information in the hard disk of the PC 100 at step S116. Meanwhile, it is preferable that the pop-up window be displayed with the effect (for example, "You may watch your records when you play the game on another PC") appearing when the user option information is stored on the storage medium 50 or in the hard disk.

When the user requests that option information be stored, variables generated when the game is moved forward, or game information are stored in the hard disk or on the storage medium 50 at steps S118 and S119.

The scope of the present invention is not limited to the above-described embodiments and defined as disclosed in the accompanying claims. It is apparent that those skilled in the art can perform various modifications and adaptations without departing from the scope of the invention as disclosed in the accompanying claims.

The invention claimed is:

1. An online game provision method using a storage medium, the method comprising the steps of:
   (a) detecting that a storage medium storing a video and image file, a sound file, a game program executable file, a latest patch executable file and an account authority processing executable file which are necessary to play a game was input to a Personal Computer (PC);
   (b) accessing a database server, wherein the latest patch executable file is automatically executed by an Operating System (OS), and receiving information about a version of each of patch files corresponding to the video and image file, the sound file, and the game program executable file;
   (c) comparing the information about the version of the patch file with information about a version of each of game files corresponding to the video and image file, the sound file, and the game program executable file which are stored on the storage medium, receiving each of the patch files, the information about the version of which is higher than the information about the version of the game file, and storing the received each of the patch files in a "My document" directory; and
   (d) making an inquiry to the OS about whether a current user of the PC has execution authority for a hard disk or execution authority for the storage medium,
   playing the game wherein the game program executable file stored on the storage medium is executed, and each of the patch files stored in the "My document" directory is read into memory when the current user does not have the execution authority for the hard disk but has the execution authority for the storage medium,
   playing the game wherein the account authority processing executable file is executed so as to make an inquiry to the user about administration authority account information, administration account authority is approved by the OS using the administration authority account information, an arbitrary directory to which execution authority is given is generated in the "My document" directory, each of the game files stored on the storage medium and each of the patch files stored in the My document directory are copied into the generated directory, and the game program executable file from among the copied game files is executed when the current user does not have the execution authority for the hard disk nor the storage medium, and
   playing the game wherein an arbitrary directory to which execution authority is given is generated in the hard disk, each of the game files stored on the storage medium and each of the patch files stored in the "My document" directory are copied into the generated directory, and the game program executable file from among the copied game files is executed when the current user has the execution authority for the hard disk.

2. The online game provision method according to claim 1, wherein the storage medium is a read-only storage medium which comprises Secure Digital (SD) memory or a Digital Versatile Disc (DVD).

3. The online game provision method according to claim 1, wherein the storage medium is a writable storage medium which comprises Universal Serial Bus (USB) memory;
   wherein the step (c) comprises:
   comparing the information about the version of each of the patch files with information about a version of each of the game files corresponding to the video and image file, the sound file, and the game program executable file which are stored on the storage medium, receiving each of the patch files, the information about the version of which is higher than the information about the version of each of the game files, and storing the received each of the patch files in a "My document" directory; and
   making an inquiry to the user about whether to update one of the game files stored on the storage medium to a latest file, and storing the corresponding patch file stored in the "My document" directory on the storage medium when the user selected to "overwrite now"; and
   wherein the step (d) comprises storing the corresponding patch file stored in the "My document" directory on the storage medium using a separate process at a same time that the game is played when the user selected to "overwrite while playing the game" at the step (c).

4. The online game provision method according to claim 1, wherein the storage medium is a writable storage medium which comprises USB memory; and
   wherein the online game provision method further comprises (e) making an inquiry to the user about whether to store user option information which comprises information about game settings and individual play in the game, and storing the user option information on the storage medium when the user selected to store the user option information.

5. An online game provision system using a storage medium, the online game provision system comprising:
   a database server configured to store patch files corresponding to a video and image file, a sound file and a game program executable file which are necessary to play a game, and information about a version of each of the patch files;

a storage medium configured to store the video and image file, the sound file, the game program executable file, a latest patch executable file, and an account authority processing executable file which are necessary to play the game; and a PC connected to the database server in a wired/wireless manner, configured so that the storage medium is input, and configured to comprise an OS for detecting the input of the storage medium and automatically executing the latest patch executable file stored on the storage medium; and wherein the latest patch executable file accesses the database server and receives information about the version of each of the patch files corresponding to the video and image file, the sound file and the game program executable file, compares the information about the version of each of the patch files with information about a version of each of game files corresponding to the video and image file, the sound file, and the game program executable file which are stored on the storage medium, receives each of the patch files, the information about the version of which is higher than the information about the version of the game file, from the database server and stores the received patch file in a "My document" directory, makes an inquiry to the OS about whether a current user of the PC has execution authority for a hard disk or execution authority for the storage medium, executes the game program executable file stored on the storage medium when the current user does not have execution authority for the hard disk but has the execution authority for the storage medium, executes the account authority processing executable file so as to make an inquiry to the user about administration authority account information, receives administration authority, generates an arbitrary directory, to which execution authority is given, in the "My document" directory, copies each of the game files stored on the storage medium and each of the patch files stored in the "My document" directory into the generated directory, and executes the game program executable file from among the copied game files when the current user does not have the execution authority for the hard disk nor the storage medium, and generates an arbitrary directory, to which execution authority is given, in the hard disk, copies each of the game files stored on the storage medium and each of the patch files stored in the "My document" directory into the generated directory, and executes the game program executable file from among the copied game files when the current user has the execution authority for the hard disk;

wherein the game program executable file plays the game wherein the corresponding game file and the corresponding patch file are copied and combined in memory when the game program executable file is executed on the storage medium, and plays the game using the game file stored in a same directory when the game program executable file is executed in the arbitrary directory generated in the "My document" directory and when the game program executable file is executed in the arbitrary directory, to which execution authority is given, generated in the hard disk; and wherein the account authority processing executable file makes an inquiry to the user about the administration authority account information, and then receives administration account authority from the OS using the administration authority account information.

6. The online game provision system according to claim 5, wherein the storage medium is a read-only storage medium which comprises SD memory or a DVD.

7. The online game provision system according to claim 5, wherein the storage medium is a writable storage medium which comprises USB memory; and wherein the latest patch executable file receives each of the patch files, the information about the version of which is higher than the information about the version of each of the game files, from the database server and stores each of the patch files in the "My document" directory, makes an inquiry to the user about whether to update the game file stored on the storage medium to a latest file, stores the corresponding patch file stored in the "My document" directory on the storage medium when the user selected to "Overwrite Now", and stores the corresponding patch file stored in the "My document" directory on the storage medium while the game program executable file is playing the game when the user selected to "Overwrite while playing the game".

8. The online game provision system according to claim 5, wherein the storage medium is a writable storage medium which comprises USB memory; and wherein the game program executable file makes an inquiry to the user about whether to store user option information which comprises information about game settings and individual play in the game, and stores the user option information on the storage medium when the user selected to store the user option information.

* * * * *